(12) United States Patent
Robinet

(10) Patent No.: US 7,025,037 B2
(45) Date of Patent: Apr. 11, 2006

(54) INTERNAL-COMBUSTION ENGINE WITH PRECOMBUSTION CHAMBER AND CONTROLLED IGNITION

(75) Inventor: Cyril Robinet, Igny (FR)

(73) Assignee: Peugeot Citroen Automobiles SA, Veliza-Villacoublay (FR)

( * ) Notice: Subject to any disclaimer, the term of this patent is extended or adjusted under 35 U.S.C. 154(b) by 0 days.

(21) Appl. No.: 10/817,744

(22) Filed: Apr. 2, 2004

(65) Prior Publication Data

US 2004/0261760 A1    Dec. 30, 2004

(30) Foreign Application Priority Data

Apr. 4, 2003    (FR) .................................. 03 04237

(51) Int. Cl.
*F02B 19/12*    (2006.01)
(52) U.S. Cl. .................. 123/261; 123/275; 123/293
(58) Field of Classification Search ............... 123/266, 123/253, 267, 274, 275, 260, 261, 293
See application file for complete search history.

(56) References Cited

U.S. PATENT DOCUMENTS 4,779,587 A * 10/1988 Schweinzer et al. ........ 123/276
5,992,364 A    11/1999 Bubeck et al. ........ 123/169 PH
2002/0026923 A1    3/2002 Bertsch et al. ............... 123/300

FOREIGN PATENT DOCUMENTS

| DE | 1526290 | 4/1970 |
| EP | 1207285 A1 | 5/2002 |
| FR | 2781840 | 2/2000 |
| WO | 98/45588 | 10/1998 |

* cited by examiner

*Primary Examiner*—Tony M. Argenbright
(74) *Attorney, Agent, or Firm*—Osha Liang LLP

(57) ABSTRACT

The disclosure concerns an internal combustion engine with controlled ignition having at least a combustion chamber (4), means (8, 18) for injection of fuel or an air-fuel mixture into the combustion chamber (4), ignition means (7) to generate an ignition of the air-fuel mixture in the combustion chamber (4), the ignition means (7) comprising a spark generator (13) arranged in a precombustion chamber (1) delimited by a wall (12), the precombustion chamber (1) communicating with the combustion chamber (4) through at least a port (5) formed in the wall (12), wherein the means (8, 18) for injection are adapted to inject the fuel into the combustion chamber (4) at a pressure of at least 250 bar such as to create an air fuel mixture and to make it easier for a part of this mixture to penetrate inside the precombustion chamber (1).

13 Claims, 2 Drawing Sheets

INTERNAL-COMBUSTION ENGINE WITH PRECOMBUSTION CHAMBER AND CONTROLLED IGNITION

CROSS-REFERENCE TO RELATED APPLICATIONS

This application claims priority from the French patent application Nr 0304237 filed on Apr. 4, 2003.

BACKGROUND OF INVENTION

1. Field of the Invention

The invention relates to an internal-combustion engine with precombustion chamber and controlled ignition.

2. Background Art

The invention concerns more particularly an internal combustion engine with controlled ignition comprising at least a cylinder, a cylinder head sealing the cylinder, a piston mounted to slide inside the cylinder, a combustion chamber defined inside the cylinder between an upper face of the piston and a lower face of the cylinder head, means for injection of fuel or an air-fuel mixture into the combustion chamber, ignition means to generate an ignition of the air-fuel mixture in the combustion chamber, the ignition means comprising a spark generator arranged in a precombustion chamber delimited by a wall, the precombustion chamber communicating with the combustion chamber through at least a port formed in the wall.

Such an engine is known in particular from the published French patent application Nr FR2781840.

The prior art engine may have combustion instabilities when working at small load, in particular when working at the so-called "idle" of the engine.

SUMMARY OF INVENTION

In some embodiments, the invention provides an internal combustion engine with controlled ignition comprising at least a cylinder, a cylinder head sealing the cylinder, a piston mounted to slide inside the cylinder, a combustion chamber defined inside the cylinder between an upper face of the piston and a lower face of the cylinder head, means for injection of fuel or an air-fuel mixture into the combustion chamber, ignition means to generate an ignition of the air-fuel mixture in the combustion chamber, the ignition means comprising a spark generator arranged in a precombustion chamber delimited by a wall, the precombustion chamber communicating with the combustion chamber through at least a port formed in the wall. The means for injection are adapted to inject the fuel into the combustion chamber at a pressure of at least 250 bar such as to create an air fuel mixture and to make it easier for a part of this mixture to penetrate inside the precombustion chamber.

Furthermore, the invention may comprise one or many of the following characteristics:

the wall of the precombustion chamber comprises a plurality of ports, at least one of the ports has passing through dimensions prohibiting the passing through of a flame front from the precombustion chamber to the combustion chamber, while allowing the passing through of instable elements resulting from the combustion in the precombustion chamber in order to enable a self-ignition of the air-fuel mixture of the combustion chamber, at least one of the ports has passing through dimensions allowing the passing through of a flame front from the precombustion chamber to the combustion chamber, all the ports have passing through dimensions prohibiting the passing through of a flame front from the precombustion chamber to the combustion chamber, while allowing the passing through of instable elements resulting from the combustion in the precombustion chamber in order to enable a self-ignition of the air-fuel mixture of the combustion chamber, the wall of the precombustion chamber is made of a material having a thermal conductivity greater than 10 W/K/m, the wall of the precombustion chamber is made of a copper alloy, the means for injection and the ignition means are relatively arranged such that the wall of the precombustion chamber is at least partly located on the path of the fuel injected by the means for injection, such as to moisten with fuel at least partly the wall of the precombustion chamber during an injection of fuel in the combustion chamber, at least in a working range of the engine the quantity of fuel delivered by the means for injection for a combustion cycle is divided into a plurality of partial and distinct injections, at least one of the partial injections is delivered prior to the ignition of the load in the combustion chamber by the ignition means, and at least a partial injection is delivered after this ignition, the fuel is petrol.

Further features and advantages will appear at the reading of the following description made in reference to the figures wherein:

DETAILED DESCRIPTION

Figure 1:
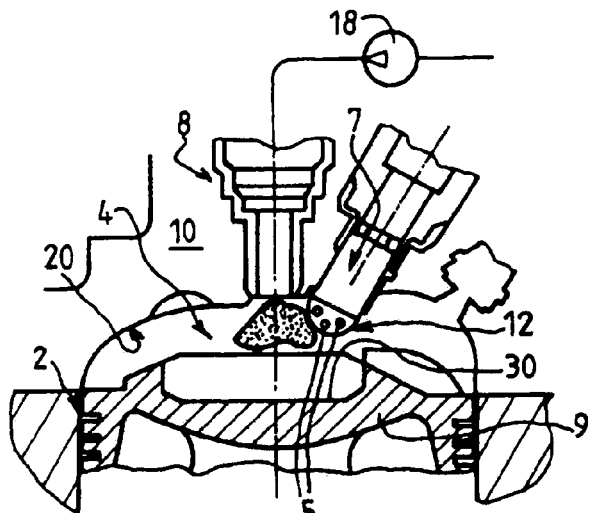
FIG. 1 represents a sectional view, which is schematic and partial, of an internal combustion engine according to an embodiment of the invention at a first instant of a combustion cycle.

Although the prior art type of engine globally works satisfactorily, in particular to inhibit the knocking sound when working at heavy load, there are however combustion instabilities when working at small load, in particular when working at the so-called "idle" of the engine.

One aim of the present invention is to overcome all or part of the disadvantages of prior art listed here above and to suggest an internal combustion engine with precombustion chamber and controlled ignition having an improved way of working as compared to the prior art.

The internal combustion engine represented in FIGS. 1 to 4 comprises at least a cylinder 2, a cylinder head 10 sealing the cylinder 2 and a piston 9 mounted to slide inside the cylinder 2.

A combustion chamber 4 is hence defined inside the cylinder 2 between an upper face 30 of the piston 9 and a lower face 20 of the cylinder head 10. The upper face 30 of the piston 9 may form a cavity that is intended to enclose the fuel.

The engine comprises means 8, 18 of injection of fuel into the combustion chamber 4, made, for example, of an injector 8 supplied with fuel by an injection pump 18. As represented, the injector 8 may be arranged substantially along the longitudinal axis of symmetry of the cylinder 2.

Ignition means 7 intended to generate an ignition of the air-fuel mix in the combustion chamber 4 are arranged adjacent to the injector 8.

In at least its part oriented towards the combustion chamber 4, the precombustion chamber 1 is delimited by a wall 12. The precombustion chamber 1 communicates with the combustion chamber 4 through at least a port 5 and preferably through a plurality of ports, formed in the wall 12.

According to the invention, the means for injection 8, 18 are adapted to inject the fuel into the combustion chamber 4 at a pressure of at least 250 bars, such as to create an air fuel mixture that may penetrate inside the precombustion chamber 1.

The pulverization, the atomization and the evaporation of the injected fuel are improved according to the invention. This provides a better transit of the fuel from the combustion chamber 4 to the precombustion chamber 1.

The air-fuel mixture brought into the precombustion chamber 1 hence has a richness and a capability to ignition that is improved as compared to the prior art. The combustion of the engine according to the invention is hence improved.

Moreover, the injection according to the invention has a sorter duration for a same quantity of injected fuel, that allows to delay an injection during a combustion cycle, or an injection at a more precise time of the cycle.

Figure 6:
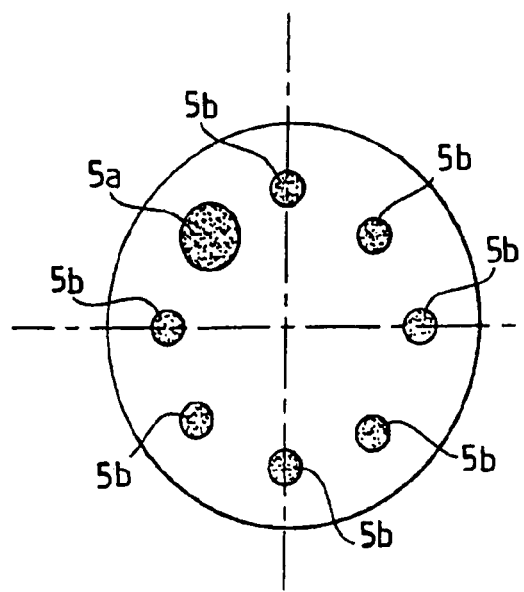
FIG. 6 represents a view from below of the ignition means of the engine of FIG. 5, illustrating a wall delimiting the ignition means.

In the example of embodiment represented in the FIG. 6, the wall 12 of the precombustion chamber 1 has 8 ports.

A port 5a of the ports has passing through dimensions allowing the passing through of a flame front from the precombustion chamber 1 to the combustion chamber 4. The other ports 5b have passing through dimensions prohibiting the passing through of a flame front from the precombustion chamber 1 to the combustion chamber 4, but allowing the passing through of instable elements resulting from the combustion in the precombustion chamber 1 in order to enable a self-ignition of the air-fuel mixture of the combustion chamber 4.

It is understood that this embodiment is not limitative and, that in other alternatives not represented:

all the port may have dimensions allowing the passing through of a flame front, or all the ports may have dimensions prohibiting the passing through of a flame front but allowing the passing through of instable elements resulting from the combustion in the precombustion chamber 1 in order to enable a self-ignition of the air-fuel mixture of the combustion chamber 4.

Furthermore, other combinations of ports 5a, 5b allowing or prohibiting the passing through of a flame front are possible and are part of the invention.

A port that only allows instable elements to pass through (and not a flame front) has, for example, a passing through diameter smaller than 1 mm. A port 5a allowing a flame front to pass through has, for example, a diameter comprised between 1 and 3 mm.

Preferably, the ports 5 have a length smaller than their diameter.

Also preferably, the wall 12 of the precombustion chamber 1 is made of a material having a thermal conductivity greater than 10 W/K/m and preferably greater than 30 W/K/m. For example, the wall 12 of the precombustion chamber 1 is made of a copper alloy with high conductivity of the type CuCr1Zr.

Figure 2:
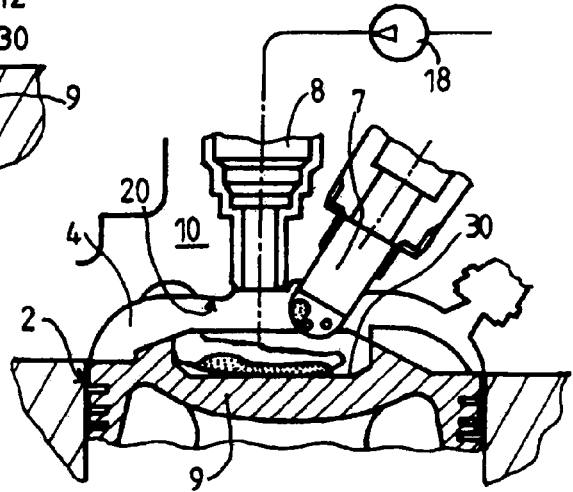
FIGS. 2 to 4 represent views similar to the one of FIG. 1, at respectively three other later instants of the combustion cycle.

According to an other preferable characteristic of the invention, the injector 8 and the ignition means 7 are relatively arranged such that the wall 12 of the precombustion chamber 1 is at least partly located on the direct path of the fuel short after it comes out of the injector 8 (FIG. 1). In this way, the injector 8 moistens with fuel at least partly the wall 12 of the precombustion chamber 1 during an injection of fuel in the combustion chamber 4 (FIG. 2).

Figure 3:
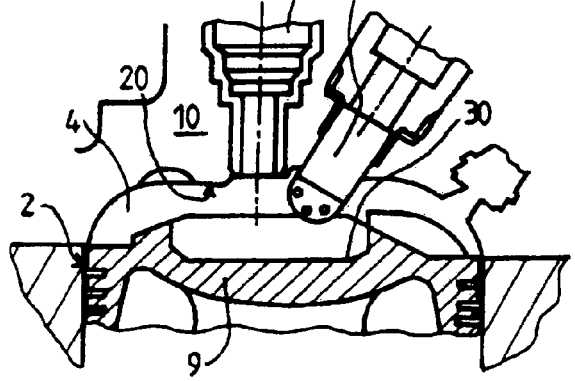

The manner of injection according to the invention allows a more important a quicker vaporization of the fuel that moistens the wall 12 (FIG. 2), and a better supply of the precombustion chamber 1 with fuel (FIG. 3: upward motion of fuel vapors in the precombustion chamber during the compression phase in particular).

Figure 4:
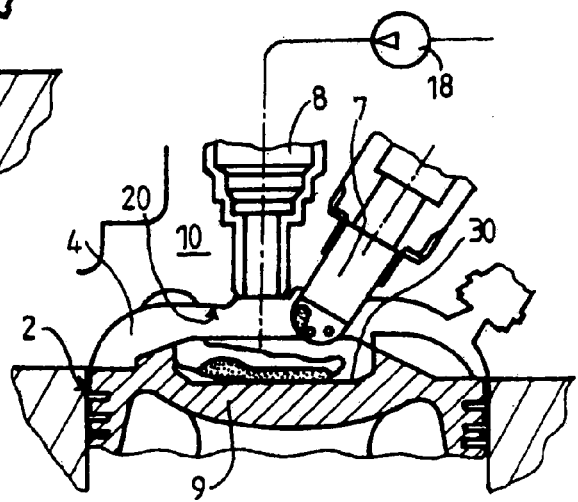
Figure 5:
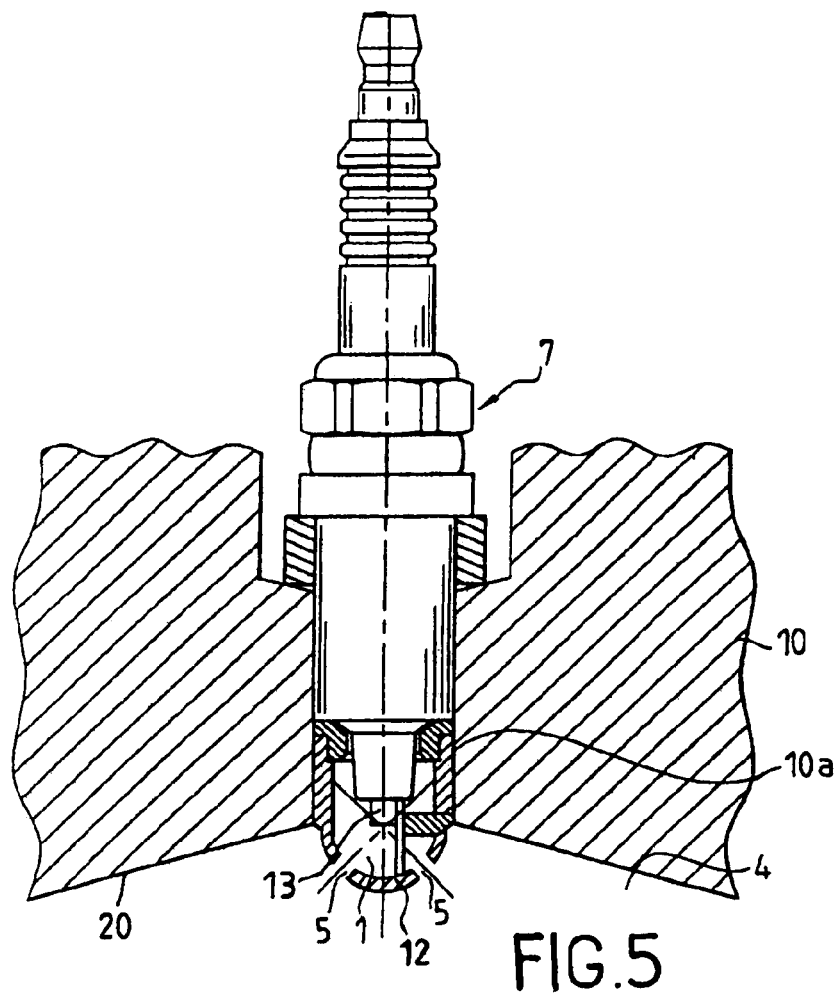
FIG. 5 represents a partly sectional view, which is schematic and magnified, of a detail of the engine of the FIG. 1, illustrating the ignition means of the engine.

The subsequent ignition of the mixture in the precombustion chamber 1 by the sparking plug 13 is hence improved, as well as the passing through of the flame front and/or instable compounds from the precombustion chamber 1 to the combustion chamber 4. This way a better combustion of the air-fuel mixture in the combustion chamber 4 is obtained (FIG. 4).

According to embodiments of the invention, the pressure of the fuel supplied to the injector 8 is comprised preferably between 250 and 2500 bar. This high pressure injection allows a better atomization of the air-fuel mixture and a better homogenization of the load, in particular when the pressure of the injected fuel reaches or exceeds 500 bar.

This better atomization of the load also increases the cooling of the air-fuel load due to the latent vaporization heat of the mixture during the atomization. This contributes to improve the combustion of the load and allows to avoid that the exhaust gases reach to high temperatures that would be capable of damaging devices such as turbo compressor turbines or devices for treatment of exhaust gases.

Also according to embodiments of the invention, the quantity of fuel delivered by the means for injection for a combustion cycle may be divided into a plurality of partial and distinct injections. For example, a first injection may be made to make fuel penetrate into the precombustion chamber 1. The single or the plurality of subsequent injections may be made before and/or during and/or after the ignition of the load in the precombustion chamber 1. This manner of injection additionally improves the efficiency of the combustion.

In an advantageous embodiment, the fuel is petrol.

What is claimed is:

1. An internal combustion engine with controlled ignition, comprising:

at least a cylinder, a cylinder head sealing the cylinder, a piston mounted to slide inside the cylinder, a combustion chamber defined inside the cylinder between an upper face of the piston and a lower face of the cylinder head, a precombustion chamber delimited by a wall, the precombustion chamber communicating with the combustion chamber through at least a port formed in the wall, means for injection of fuel or an air-fuel mixture into the combustion chamber, the means for injection being adapted to inject the fuel into the combustion chamber at a pressure of at least 250 bar such as to create an air-fuel mixture and to make it easier for a part of this mixture to penetrate inside the precombustion chamber, ignition means to generate an ignition of the air-fuel mixture in the combustion chamber, the ignition means comprising a spark generator arranged in the precombustion chamber.

2. The engine according to claim 1, wherein the wall of the precombustion chamber comprises a plurality of ports.

3. The engine according to claim 2, wherein at least one of the ports has passing through dimensions prohibiting the passing through of a flame front from the precombustion chamber to the combustion chamber, while allowing the passing through of instable elements resulting form the combustion in the precombustion chamber in order to enable a self-ignition of the air-fuel mixture of the combustion chamber.

4. The engine according to claim 2, wherein at least one of the ports has passing through dimensions allowing the passing through of a flame front from the precombustion chamber to the combustion chamber.

5. The engine according to claim 2, wherein the ports have passing through dimensions prohibiting the passing through of a flame front from the precombustion chamber to the combustion chamber, while allowing the passing through of instable elements resulting from the combustion in the precombustion chamber in order to enable a self-ignition of the air-fuel mixture of the combustion chamber.

6. The engine of claim 1, wherein the wall of the precombustion chamber is made of a material having a thermal conductivity greater than 10 W/K/m.

7. The engine of claim 1, wherein the wall of the precombustion chamber is made of a copper alloy.

8. The engine of claim 1, wherein the means for injection and the ignition means are relatively arranged such that the wall of the precombustion chamber is at least partly located on the path of the fuel injected by the means for injection, such as to moisten with fuel at least partly the wall of the precombustion chamber during an injection of fuel in the combustion chamber.

9. The engine of claim 1, wherein at least in a working range of the engine, the quantity of fuel delivered by the means for injection for a combustion cycle is divided into a plurality of partial and distinct injections.

10. The engine of claim 9, wherein at least one of the partial injections is delivered prior to ignition of the load in the combustion chamber by the ignition means, and at least a partial injection is delivered after this ignition.

11. The engine of claim 1, wherein the fuel is petrol.

12. The engine according to claim 3, wherein at least one of the ports has passing through dimensions allowing the passing through of a flame front from the precombustion chamber to the combustion chamber.

13. The engine according to claim 3, wherein the ports have passing through dimensions prohibiting the passing through of a flame front from the precombustion chamber to the combustion chamber, while allowing the passing through of instable elements resulting from the combustion in the precombustion chamber in order to enable a self-ignition of the air-fuel mixture of the combustion chamber.

* * * * *